United States Patent [19]

Berner

[11] Patent Number: 4,629,374
[45] Date of Patent: Dec. 16, 1986

[54] BORING TOOL WITH CUTTING EDGE ADJUSTMENT FOR WITHDRAWAL CLEARANCE

[75] Inventor: Willy Berner, Rupperswil, Switzerland

[73] Assignee: Urma AG, Rupperswil, Switzerland

[21] Appl. No.: 708,787

[22] Filed: Mar. 6, 1985

[30] Foreign Application Priority Data

Mar. 16, 1984 [CH] Switzerland .................. 1356/84

[51] Int. Cl.⁴ ........................................... B23B 31/04
[52] U.S. Cl. ...................................... 408/186; 279/7; 403/296; 403/343; 408/239 A
[58] Field of Search .................. 408/16, 18, 116, 186, 408/187, 239 R, 239 A, 713; 279/1 ME, 7; 403/47, 296, 343

[56] References Cited

U.S. PATENT DOCUMENTS

| 1,952,996 | 3/1934 | Landgraf | 403/47 |
| 2,222,307 | 11/1940 | Blood | 408/187 |
| 2,222,313 | 11/1940 | Heald | 408/187 |
| 2,849,902 | 9/1958 | DeVlieg et al. | 408/181 |
| 3,153,356 | 10/1964 | Dearborn | 403/343 |
| 3,521,507 | 7/1970 | Yogus et al. | 408/239 |
| 3,874,824 | 4/1975 | Cronstedt et al. | 403/47 |

FOREIGN PATENT DOCUMENTS 2137124 10/1984 United Kingdom .................. 279/7

*Primary Examiner*—Gil Weidenfeld
*Assistant Examiner*—Daniel W. Howell
*Attorney, Agent, or Firm*—Walter C. Farley

[57] ABSTRACT

A boring tool has a radially adjustable tool bit holder mounted on a head part connectable to an adaptor. A threaded stud for the connection between the head part and the adaptor has a thread arranged in each half, the two threads having different pitches or leads. An adjusting tool for the boring tool has a seat which mates with the threaded stud for rotating the stud relative to the thread arranged on the head part. The tool is marked with a scale in accordance with the formula S = SG2/SG1 (scale factor)

in which SG1 is the lead of one thread G1 on the threaded stud and SG2 is the lead of the other thread G2 on the threaded stud.

7 Claims, 9 Drawing Figures

BORING TOOL WITH CUTTING EDGE ADJUSTMENT FOR WITHDRAWAL CLEARANCE

The invention is in the field of cutting tools for machine tools and relates to a boring tool with an axially adjustable bit, which is mounted on a head part connectable to an adaptor.

BACKGROUND OF THE INVENTION

For the precision finishing and microfinishing of bores using rotating tools, fine boring heads are known which have a cutting edge which is screwed onto an adaptor, forming a connecting piece between the head and the machine spindle. The cutting edge of the head comes to rest at a random position on the 360° circumference. At the end of the machining of the bore, the machine spindle with the fine boring head is stopped and the tool is withdrawn from the bore in the axial direction. The cutting edge thereby produces a more or less deep groove on the bore wall and in many cases this is undesired. In the case of modern, digitally controlled machine tools, the machine spindles can always be automatically stopped in the same, predetermined radial position. The machine can be programmed in such a way that, prior to withdrawal from the finished bore, the tool can be radially displaced by a short distance, so that the cutting edge is no longer in contact with the bore wall and no groove is formed when the tool is axially withdrawn.

SUMMARY OF THE INVENTION

An object of the invention is to be able to bring the cutting edge into a randomly selectable, but in individual cases desired, angular position, in order to obviate any groove formation during the withdrawal of the tool. A further object is to allow one to set the position as simply and rapidly as possible.

BRIEF DESCRIPTION OF THE DRAWING

Briefly described, the invention comprises a boring tool with a head, an adaptor, and a threaded connection member. The head has a radially protruding cutting bit at one end, a threaded portion at the other end and a first stop face in the vicinity of the threaded portion. The adaptor also has a threaded portion and has a second stop face near the threaded portion and means at the other end for connecting the adaptor to a rotatable machine member. The threaded connection member has first and second threaded portions having threads of different pitches. The first threaded portion thereof is threadedly engageable with the threaded portion of the head and the second threaded portion is engageable with the threaded portion of the adaptor so that the head and adaptor can be joined by the connection member by threading on to the connection member until the stop faces abut each other. The connection member also includes adjustable means for selectably limiting the extent of threaded engagement of the first threaded portion with the head to thereby select the angular position of the cutting bit relative to the adaptor when the head and adaptor are joined such that the stop faces abut.

The invention is described in greater detail hereinafter relative to non-limitative embodiments and the attached drawings, wherein.

Figure 1:
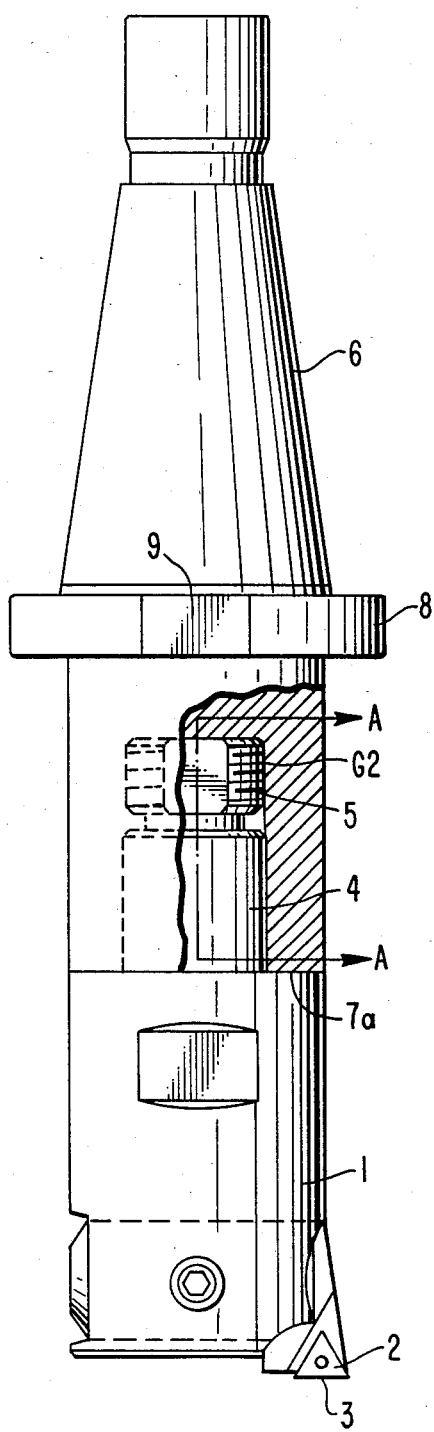
FIG. 1 is a view of a fine boring head, having one cutting edge, mounted on an adaptor for connection to a machine.
Figure 3:
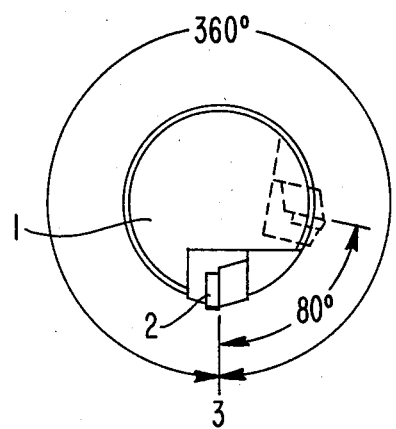
FIG. 3 is an end view of FIG. 2 in the direction of arrow B.
Figure 4:
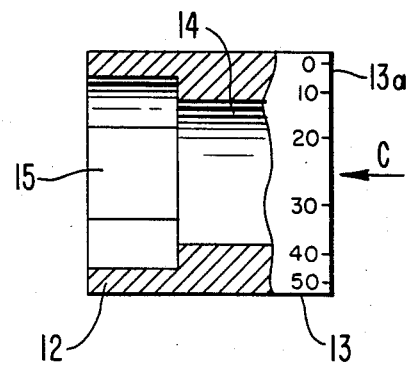
FIG. 4 is a side elevation in partial section of an adjusting sleeve.
Figure 5:
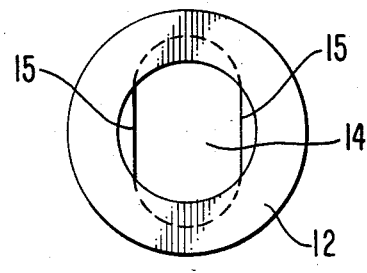
FIG. 5 is an end view of the adjusting sleeve of FIG. 4 in the direction of arrow C.

According to FIG. 1, the boring tool comprises a single-edged fine boring head 1, on whose front end is located the bit 2 with the cutting edge 3. At the other end, protruding from an end surface 7, fine boring head 1 has a cylindrical, externally smooth extension 4, followed by a threaded extension formed by the protruding end of a threaded stud 5 which comprises a connection member. The extensions are inserted in an adaptor 6 of which one end is constructed as a counterpart to the extensions 4 and 5 so that it can be screwed down until its surface 7a abuts surface 7. The adaptor acts as an intermediate part between the fine boring head and the machine. The adaptor flange 8 carries a drive slot 9, in which engages a sliding block of the machine spindle, which gives the tool a specific angular position and ensures the torque transmission during cutting. One end of the threaded stud 5 is provided with a thread having a smaller pitch or lead than the other end. Thus, by rotating threaded stud 5 in the opposite thread of internally threaded extension 4, the cutting edge 3 can be given the desired position over the entire circular range of 360° when head 1 is screwed into adaptor 6 (FIG. 3). The two flat faces 10 on one end of stud 5 are used for rotating the threaded journal 5 by means of a wrench or an adjusting sleeve 12. The threaded stud is locked in the set position by screw 11 which is threadedly received within extension 5 and is tightened after the angular position of extension 5 is set. The adjusting sleeve 12 (FIG. 4), is provided at one end with an angular degree scale 13. This graduation in degrees does not correspond to the normal graduation and is instead corrected by the value obtained from the difference of two different thread leads of threaded journal 5, so that it is possible to directly read off the desired angular correction value of cutting edge 3. Circular bore 14 fits over the diameter of extension 4. Two faces 15 on the other end of the adjusting sleeve match flat surfaces 10 of the threaded extension (FIG. 5).

For setting the tool in the desired angular position, the adjusting sleeve 12 is scaled as follows. The lead of one thread G1 of threaded journal 5 is SG1 and the lead of the other thread G2 of threaded journal 5 is SG2. There is a scale factor S according to formula $S = SG2/SG1$, virtually for increasing or decreasing the different thread leads.

The rotation position of the cutting edge 3 when the boring tool head part 1 is screwed into adaptor part 6 is determined by the axial position of the threaded journal 5 connecting adaptor part 6 and head part 1 with respect to the bearing surfaces 7a, which forms the reference plane. The different leads of the two threads G1 and G2 on threaded stud 5 leads to different path lengths when screwing the head part thread 4 into the thread of adaptor 6. This is used for determining the setting of the desired angle.

Figure 2A:
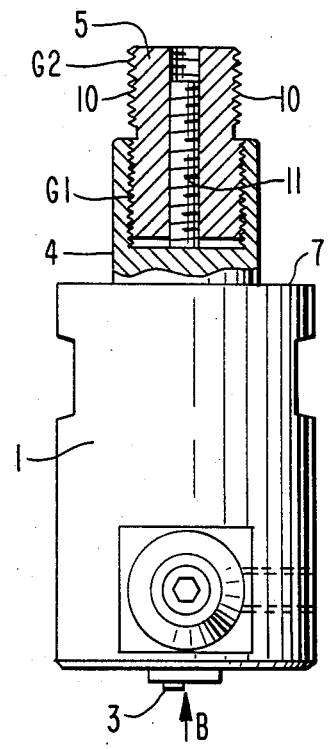
FIG. 2A is a partial section along line A—A of the head of FIG. 1.

The individual steps of this procedure are listed below:

1. Screw 11 in FIG. 2 is screwed down (retracted) into the internally threaded central bore of threaded stud 5.

2. The threaded stud 5 is prescrewed into the thread of internally threaded extension 4 on head part 1 until engagement takes place, so that stud 5 assumes a clearly defined position with respect to bearing surface 7.

3. By preturning screw 11, threaded stud 5 is locked in thread 4 of head part 1, which means that the defined position is fixed.

4. The head part 1 is now screwed into adaptor 6 until engagement with bearing surface 7 takes place.

5. In the represented embodiment, cutting edge 3 is now set as in FIG. 3. However, the desired position is that in which edge 3 is rotated counterclockwise by 80°, which is shown in FIG. 3.

6. The head part is again unscrewed from adaptor 6.

7. The adjusting sleeve 12, with the special sleeve scale 13 and with a seat matching the threaded stud 5, can now be mounted on extension 4 fixed to head part 1.

8. A reference mark is made opposite the zero mark 13a on the periphery of head part 1, preferably adjacent bearing surface 7 and marks the starting point for the following adjustment of cutting edge 3.

9. Screw 11 is then loosened again, in order to release the threaded journal 5.

10. Using adjusting sleeve 12, threaded journal 5 is now turned counterclockwise until the mark 80° is over the reference mark made in step 8. It is again pointed out that the scale on adjusting sleeve 12 is a composite graduation according to the given formula derived from the thread leads of the two threads G1, G2 of the threaded stud and must not be confused with a "conventional" graduation.

11. Threaded stud 5 is again locked by screw 11 in order to fix the set angular position.

12. The adjusting sleeve can now be removed and the boring tool screwed into the adaptor. When during the screwing into the adaptor, surface 7a engages on bearing surface 7 of head part 1, cutting edge 3 is in the desired position.

Thus, according to the invention, a boring tool has an angularly adjustable tool bit holder, mounted on a head part connectable to an adaptor and for the connection between head part 1 and adaptor 6, a threaded stud 5 is provided having threads G1, G2 arranged on its halves, the two threads having different pitches or leads (SG1<SG2 or SG1>SG2). The two threads G1, G2 of the threaded stud 5 can be external threads, internal threads or one of the two threads G1, G2 can be external and the other internal. The threaded stud 5 has an internal bore for receiving a clamping bolt 11.

The invention also covers setting means with a seat 10, 15 matable with the threaded stud 5 to ensure a clearly defined rotation of the latter relative to thread 4 on head part 1. It has a scale 13 according to the formula $$S = SG2/SG1 \text{ (scale factor)}$$

with a scale factor S, SG1 being the lead of one thread G1 on threaded stud 5 and SG2 the lead of the other thread G2 on threaded stud 5.

Figure 2B:
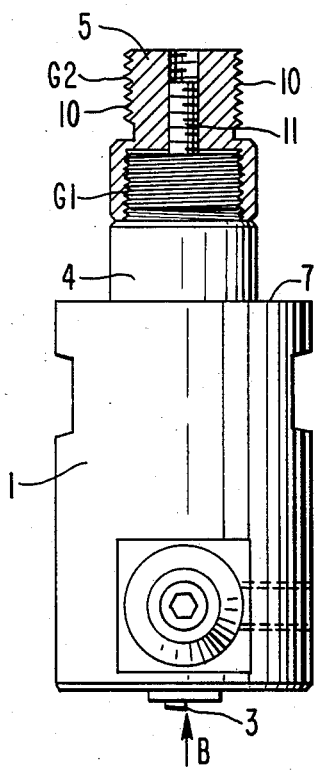
FIG. 2B is a side elevation in partial section, of a further embodiment of a boring head in accordance with the invention.
Figure 6A:
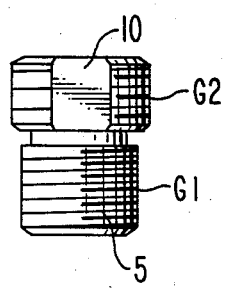
FIG. 6A is a view of a connection member with two external different threads.
Figure 6B:
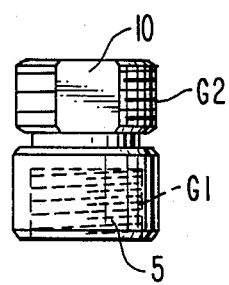
FIGS. 6B and 6C are further embodiments of connection members usable with the boring head shown in FIG. 2B.
Figure 6C:
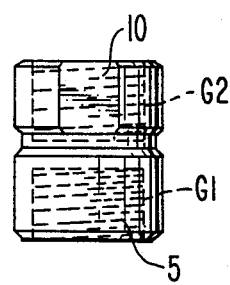

FIG. 2B shows a further embodiment of the invention in which the boring head has a smooth extension 4 and an externally threaded extension in place of the stud, this embodiment being usable with connection members such as those shown in FIGS. 6B and 6C. As will be recognized, the connection member of FIG. 6B has an internally threaded opening engageable with the threaded extension on the boring head and has an externally threaded portion to engage the adaptor member. FIG. 6C is usable with an adaptor head having a threaded extension rather than an internally threaded bore. The principles, however, are exactly the same as described in connection with the first embodiment.

I claim:

1. A boring tool comprising
    a head having a radially protruding cutting bit at one end and a threaded portion and a first stop face at the other end;
    an adaptor having a threaded portion and a second stop face at one end and means at the other end for connection to a rotatable machine member;
    a threaded connection member having first and second threaded portions having threads of different pitches, said first threaded portion being threadedly engageable with said threaded portion at said other end of said head and said second threaded portion of said connection member being threadedly engageable with said threaded portion of said adaptor so that said head and adaptor can be joined by said connection member with said stop faces abutting; and
    adjustable means for selectably limiting the extent of threaded engagement of said first threaded portion and said head to thereby select the angular position of said cutting bit relative to said adaptor when said head and adaptor are joined and said stop faces abut.

2. A boring tool according to claim 1 wherein said first threaded portion has a smaller pitch than said second threaded portion.

3. A boring tool according to claim 1 wherein said first and second threaded portions are external threads.

4. A boring tool according to claim 1 wherein said first and second threaded portions are internal threads.

5. A boring tool according to claim 1 wherein one of said first and second threaded portions is an internal thread and the other thereof is an external thread.

6. A boring tool according to claim 1 wherein said adjustable means includes an internally threaded bore extending through said connection member and a clamping screw in said bore, said screw being rotatable to adjust the extent of protrusion thereof toward said boring head.

7. A boring tool according to claim 1 and further comprising
    an adjustment tool having means engageable with said connection member for rotating said member relative to the thread on said head member, said tool being marked with a scale calibrated in accordance with the formula $S = SG2/SG1$ wherein S is a scale factor, SG1 is the pitch of said first threaded portion and SG2 is the pitch of the second threaded portion on said connection member.

* * * * *